(12) United States Patent
Marking et al.

(10) Patent No.: US 8,775,811 B2
(45) Date of Patent: Jul. 8, 2014

(54) SIMPLE NON-AUTONOMOUS PEERING ENVIRONMENT, WATERMARKING AND AUTHENTICATION

(75) Inventors: Aaron Marking, Portland, OR (US); Kenneth Goeller, Los Angeles, CA (US)

(73) Assignee: Secure Content Storage Association LLC, Beaverton, OR (US)

( * ) Notice: Subject to any disclaimer, the term of this patent is extended or adjusted under 35 U.S.C. 154(b) by 1341 days.

(21) Appl. No.: 12/369,708

(22) Filed: Feb. 11, 2009

(65) Prior Publication Data

US 2009/0204778 A1 Aug. 13, 2009

Related U.S. Application Data

(60) Provisional application No. 61/148,295, filed on Jan. 29, 2009, provisional application No. 61/096,686, filed on Sep. 12, 2008, provisional application No. 61/082,404, filed on Jul. 21, 2008, provisional application No. 61/027,757, filed on Feb. 11, 2008.

(51) Int. Cl.
*H04L 9/32* (2006.01)
*G06F 13/00* (2006.01)

(52) U.S. Cl.
USPC .......................................... 713/176; 711/163

(58) Field of Classification Search
USPC ........................................................ 713/176
See application file for complete search history.

(56) References Cited

U.S. PATENT DOCUMENTS

| | | | |
|---|---|---|---|
| 4,577,289 A | 3/1986 | Comerford et al. | |
| 5,956,716 A | 9/1999 | Kenner et al. | |
| 6,029,259 A | 2/2000 | Sollish et al. | |
| 6,092,195 A | 7/2000 | Nguyen | |
| 6,253,193 B1 | 6/2001 | Ginter et al. | |
| 6,668,304 B1 | 12/2003 | Satran et al. | |
| 7,017,044 B1 | 3/2006 | Carpenter et al. | |
| 2002/0056118 A1 | 5/2002 | Hunter et al. | |
| 2002/0114456 A1* | 8/2002 | Sako | 380/201 |
| 2003/0056101 A1* | 3/2003 | Epstein | 713/176 |
| 2003/0118208 A1* | 6/2003 | Epstein | 382/100 |
| 2003/0187679 A1 | 10/2003 | Odgers et al. | |
| 2004/0025025 A1 | 2/2004 | Venkatesan et al. | |
| 2004/0103305 A1 | 5/2004 | Ginter et al. | |
| 2004/0225894 A1 | 11/2004 | Colvin | |
| 2005/0027996 A1* | 2/2005 | Wittkoter | 713/193 |
| 2005/0055214 A1* | 3/2005 | Kirovski et al. | 704/273 |
| 2005/0086480 A1* | 4/2005 | Kerr et al. | 713/176 |

(Continued)

FOREIGN PATENT DOCUMENTS

| | | |
|---|---|---|
| CN | 1365056 A | 8/2002 |
| CN | 1639694 A | 7/2005 |

(Continued)

OTHER PUBLICATIONS

Arnold et al. "Real-time Concepts for Block-based Watermarking Schmes" . 2002. IEEE.*

(Continued)

*Primary Examiner* — Cordelia Zecher
*Assistant Examiner* — Abdullah Almamun
(74) *Attorney, Agent, or Firm* — Gates & Cooper LLP

(57) ABSTRACT

A Secure Non-autonomous Peering (SNAP) system includes a hierarchical digital watermarking scheme, a central licensing authority, licensed fabricators and assemblers.

22 Claims, 16 Drawing Sheets

(56) References Cited

U.S. PATENT DOCUMENTS

| | | | |
|---|---|---|---|
| 2005/0108541 A1* | 5/2005 | Yacobi et al. | 713/176 |
| 2006/0085343 A1 | 4/2006 | Lisanke et al. | |
| 2006/0161776 A1* | 7/2006 | Van Der Veen et al. | 713/176 |
| 2006/0177096 A1* | 8/2006 | Malik et al. | 382/100 |
| 2006/0282676 A1* | 12/2006 | Serret-Avila et al. | 713/176 |
| 2008/0279376 A1 | 11/2008 | Jin et al. | |
| 2008/0301456 A1* | 12/2008 | Staring et al. | 713/176 |
| 2009/0204778 A1 | 8/2009 | Marking et al. | |
| 2010/0228983 A1* | 9/2010 | Killian et al. | 713/176 |
| 2010/0246810 A1* | 9/2010 | Srinivasan et al. | 380/28 |

FOREIGN PATENT DOCUMENTS

| | | |
|---|---|---|
| EP | 0610623 | 8/1994 |
| EP | 0917132 | 5/1999 |
| JP | 60145501 | 8/1985 |
| JP | 08129828 | 5/1996 |
| JP | 11265545 | 9/1999 |
| JP | 2002518784 | 6/2002 |
| JP | 2003263371 | 9/2003 |
| WO | 9962022 | 12/1999 |
| WO | WO 00/56059 * | 9/2000 ............... H04N 1/32 |
| WO | 0219589 | 3/2002 |
| WO | 0229510 | 4/2002 |
| WO | 03075163 | 12/2003 |
| WO | WO 2007072372 A2 * | 6/2007 ............... G06F 21/00 |

OTHER PUBLICATIONS

PCT International Search Report and Written Opinion dated Jun. 3, 2009, International Application No. PCT/US09/33841.
Chinese Office Action (with English translation) dated Dec. 4, 2012 for Chinese Patent Application No. 200980113396.8.
Extended European Search Report dated Jan. 3, 2013 for European Patent Application No. 09710597.7.
Japanese Office Action (with English translation) dated Aug. 20, 2013 for Japanese Patent Application No. 2010-546108.
Extended European Search Report dated Oct. 16, 2013 for European Patent Application No. 10746857.1.
Chinese Office Action (with English translation) dated Oct. 14, 2013 for Chinese Patent Application No. 200980113396.8.
Japanese Office Action (with English translation) dated Sep. 10, 2013 for Japanese Patent Application No. 2012-520841.

* cited by examiner

SIMPLE NON-AUTONOMOUS PEERING ENVIRONMENT, WATERMARKING AND AUTHENTICATION

CROSS REFERENCE TO RELATED APPLICATIONS

This application claims benefit and priority from U.S. Provisional Patent Application Ser. No. 61/148,295, filed Jan. 29, 2009, entitled "SIMPLE NON-AUTOMOMOUS PEERING BINDING". U.S. Provisional Patent Application Ser. No. 61/096,686, filed Sep. 12, 2008, entitled "METHOD OF AUTHENTICATING NON-VOLATILE STORAGE MEDIA USING BAD BLOCKS IDENTIFIED DURING THE POST-MANUFACTURE TESTING PROCESS"; and U.S. Provisional Patent Application Ser. No. 61/082,404, filed Jul. 21, 2008, entitled "SIMPLE NONAUTONOMOUS PEERING"; and U.S. Provisional Patent Application Ser. No. 61/027,757, filed Feb. 11, 2008, entitled "ENHANCED WATERMARK PATTERNS IN A SNAP ENVIRONMENT," all of which applications are hereby incorporated by reference herein.

BACKGROUND

The use of peering networks to transfer media files from user to user has many attractive features including speed of access for a requesting user, balancing of bandwidth across the network, and reduction of bandwidth needed at a central content repository. However, users freely exchanging content may violate the content owner's property rights.

Content owners also want to restrict the copying of copyright protected content. There are many examples of technologies that make the transfer of copyright protected content very difficult. When physical media is used to store content, permanently or temporarily, (for example in electronic sell though and rental business models), content owners or their licensees use a variety of cryptographic binding methods. These methods typically use a media ID in a cryptographic function to protect the content from being copied or transferred.

Examples of a non-autonomous peering system can be found in U.S. Pat. No. 7,165,050, and US Patent Publication No. 20060064386, both titled, "Media on Demand Via Peering."

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
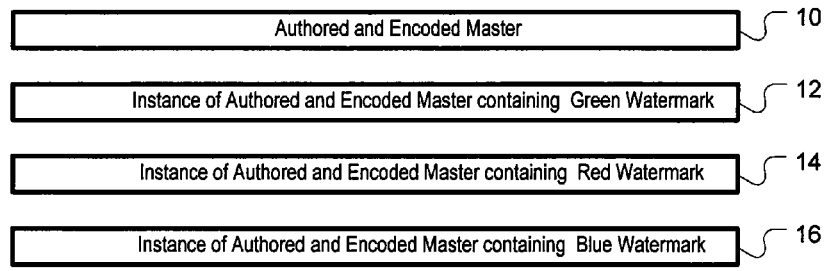
FIG. 1 shows an example of a media file having multiple instances of globally watermarked versions.

Using a simple, non-autonomous peering system (SNAP) in accordance with the description here may provide the advantages of a peering network while preventing the abuse of rights. The SNAP environment or system creates unique instances of a particular media file and allows users to 'build' that instance from other peers according to a well-defined methodology with several layers of protection. This enables a wide variety of content monetization models, including rental, sell-through, pay per view, theater exhibition and electronic sell through to various media types including but not limited to NAND flash memory, optical media, solid state hard drives, spindle hard drives, etc. These functions may be provided to consumers via secure 'swarming' where a file is provided in segments from various peers in the network or in a closed network environment or provide secure electronic distribution for points-of-sale, such as kiosks, etc.

The SNAP system uses the physical defects inherent in NAND flash media to bind content to NAND flash. These defects in NAND Flash are called Bad Blocks. NAND Flash is a type of non-volatile solid-state memory containing 2 distinct physical storage areas: a Data area composed of pages physically grouped into Blocks, and a "Spare" area for the storage of logical and physical metadata pertaining to the Data area and the data stored therein. While the configuration of these two areas may vary from Fabricator to Fabricator, both areas are present in all NAND Flash chips. NAND Flash chips are programmed on a page-by-page basis and erased in a block-wise manner in an effort to enhance performance.

Due to the inherent manufacturing methods used to make NAND Flash memory, it is common for NAND Flash chips to contain up to 5.5% defects at the time of manufacture. This is necessitated in order for chip fabricators to maintain commercially viable production yields. Since NAND Flash memory is erased on a block-by-block basis, any defect detected either during a page program cycle, or a block erase cycle dictates that the entire block of memory be identified as "Bad" in order to avoid potential data corruption. Defective blocks are identified during rigorous post-manufacturing testing, by the chip fabricator, by programming a specific value (typically 000h) into the block's spare area. Runtime detected bad blocks are marked with a different value (typically FFFh for 16 bit blocks) to the spare area.

It must be noted that the discussion below uses NAND Flash terminology and examples. However, the scope of the claims is not restricted to NAND Flash devices. Other memory technologies may have similar characteristics to NAND Flash devices and no limitation to NAND Flash devices is intended, nor should any be implied.

The SNAP system binds the unique media instances to the specific block address where the content is stored. It also uses a digital signature of the location where the unique media instances are recorded, or 'programmed' in NAND flash terminology, to authenticate the Flash Media and the recorded content. It also uses a digital signature of the location of the bad blocks to authenticate the Flash Media and the recorded content. These signatures are also used to cryptographically modify the keys required to encrypt and decrypt the unique media instance.

These two digital signatures are the basis for determining the authenticity of the Flash Media and content and used in various players and consumer electronics to stop playback or to revoke or to renew said devices and content. Since it is extremely unlikely that any useful number of NAND flash devices have the same pattern of bad blocks, the SNAP system makes unauthorized transfer the content from one NAND to device to another NAND device very difficult. The SNAP system does enable the content owner to permit the transfer of content from one NAND flash device to another NAND flash device. The transfer can be a move or a copy transaction or both. This can be done per the content owners' business rules and many or may not involve payment for such a transfer transaction. In any case, the SNAP system controls if content is transferred and does so a secure manner.

SNAP may also offer secure forensically identifiable content for us in electronic theatrical distribution systems as described in the Digital Cinema Initiative. SNAP's high degree of flexibility, security and forensic accountability come at a relatively low cost in terms of player and distribution network resources.

SNAP Environment and Pre-Processing of Media Instances

FIG. 1 shows an overview of multiple instances of an authored and encoded master media file. The system applies a different global watermark to multiple copies of the master 10. The Global watermarks may contain zero or more bits of payload data. This discussion uses colors to differentiate between the different watermarked versions, referred to here as instances. The instances 12, 14 and 16 are each encoded with a different watermark, green red and blue, respectively. Each different global watermark is identified internally by a unique global mark identifier. It must be noted that SNAP may employ many different global watermarks. Each global mark is applied to different copies of the master such that no two different global marks are applied to analogous data ranges within the master, as will be explained later.

In addition to the three different instances of the master, each of the watermarking techniques may differ from each other. Instead of having three different variations of the same watermarking technique, for example, one could use three different watermarking techniques, or vary the payload within a single watermark carrier.

Figure 2:
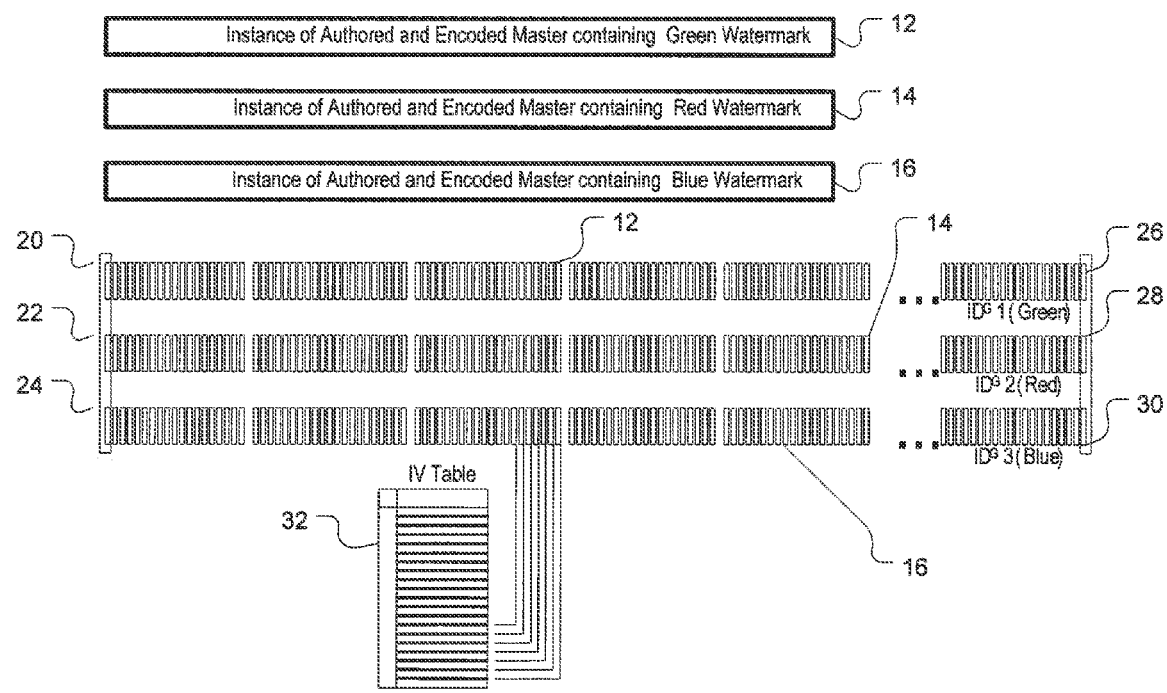
FIG. 2 shows an example of a media file being parsed into segments.

As an overview, each of these instances of the master are parsed into some predetermined number of second order segments, as shown in FIG. 2. In an alternative embodiment, it may also be possible to parse the movie data into segments prior to the application of watermarks. This method may be desirable to ensure that the watermark carrier and/or payload may be successfully encoded/detected within the data of a single segment. The number of second order segments follows a title scheme, discussed in more detail in FIG. 3. SNAP uses a bottoms-up methodology, using the second order segments to build first order segments, and using the first order segments to build expressions that will form unique instance pattern (UIP).

The second order segments of FIG. 2 will generally correspond amongst each others according to a data range. For example, the data ranges from the different instances that correspond to any particular second order segment will correspond among the colors. For example, the second order segments at the left side of the figure such as 20, 22 and 24 will correspond to the same data ranges in the red, green and blue instances 12, 14 and 16. Similarly, the ending second order segments at the right side of the figure such as 26, 28 and 30 will correspond to similar or the same data ranges among the instances. It should be noted that if watermarks are applied in the baseband of movie data prior to data compression, the inclusion if watermarking data will cause analogous segments to have different file sizes due to the presence of different watermark carrier and/or payload bits.

Because the different instances may all have different watermarks, some accommodation must be made to allow single key encryption systems that use data "chaining" such as AES-E CBC or CTR modes to transition between the segments with different watermarks. This may be accomplished with an initialization vector table 32. The initialization vector table 32 may record the last 128 bit cipher block of each second order segment. This would allow the single key encryption systems to identify the starting point for the transitions.

In CBC mode, for example, each block of cipher text is chained forward to be used in the decryption of the next block. Since SNAP segments containing different watermarks are concatenated or otherwise joined together to form a media instance, normal CBC mode would fail as the watermarking process itself would change chained blocks. By injecting the appropriate 128 bit watermarked cipher text bock in a manner similar to initialization vectors used to start a CBC chain.

As mentioned above, the second order segments are concatenated or otherwise joined together to form the first order segments. The first order segments are then concatenated to form Global segments, each expressing one element of the Unique Instance Pattern. The Global segments are then combined together to form a media instance. When a user requests a media file to be transferred, the system accesses the segments according to a title schema mentioned before. The segments may come from many different sources, including a central file server, other users on the same network, such as on a DVR network, a cable set top box network, or via direct transfer from a kiosk, etc.

Figure 3:
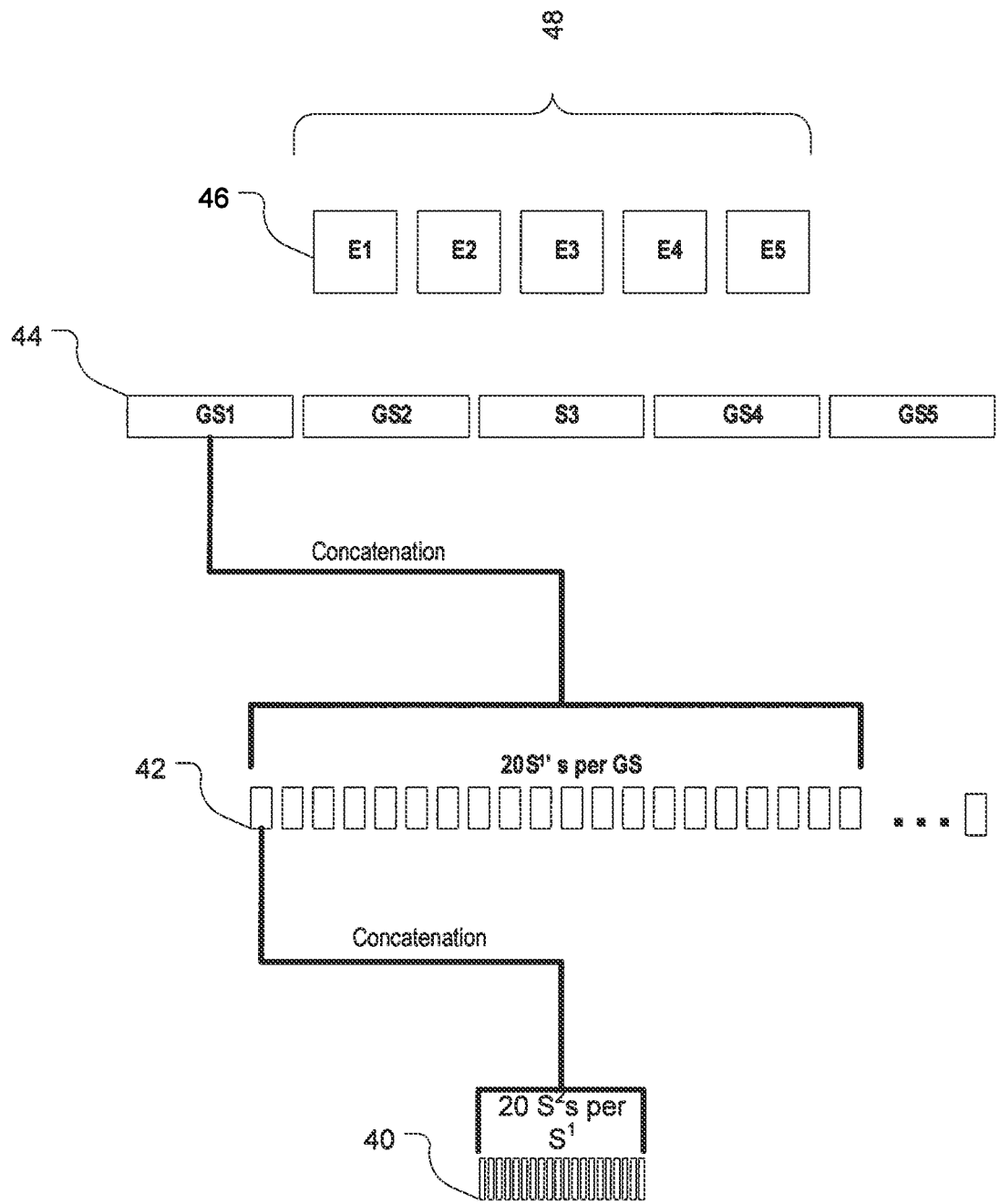
FIG. 3 shows an example of a data structure for a title schema.

An example of such a title schema is shown in FIG. 3. As mentioned above, the title schema uses a bottoms up methodology. In the example title schema used here, the instances 12, 14 and 16 are segmented into 2000 second order segments such as 40. In order to form a first order segment such as 42, 20 second order segments are concatenated together from the appropriate second order segments, in this case 100 first order segments are formed. The title schema determines which combination of which second order segments are taken from which instance. In the example given here, the first order segment S1 is formed of second order segments S1-S20, and the first order segment S100 is formed of second order segments S1981-S2000.

The formation of the global segments such as 44 results from the concatenation of the first order segments. In the example schema provided, the concatenation of 20 first order segments results in one global segment. The global segment GS1 44 in this example is formed by a concatenation of first order segments S1-S20. The term segment refers to the data range of the first or second order segment, while the term 'expression' refers to the ordering and substance of the segment as to the type and watermark of the segments that make up the first order and global segments.

It must be noted that the particular numbers given here for the number of second order segments, first order segments, global segments, etc., are merely examples and specifics are provided only as a means for easing understanding of the invention. Similarly, while the segments are joined here using concatenation, other types of joining the lower order segments together to form high order segments may also apply.

Returning to FIG. 3, one of the global segments such as 44 will correspond to one of the elements used in the unique instance pattern (UIP). It is the UIP 48 made up of elements such as 46 that the user will see as the media file desired to be downloaded or transferred. This may be better understood with reference to FIG. 4.

Figure 4:
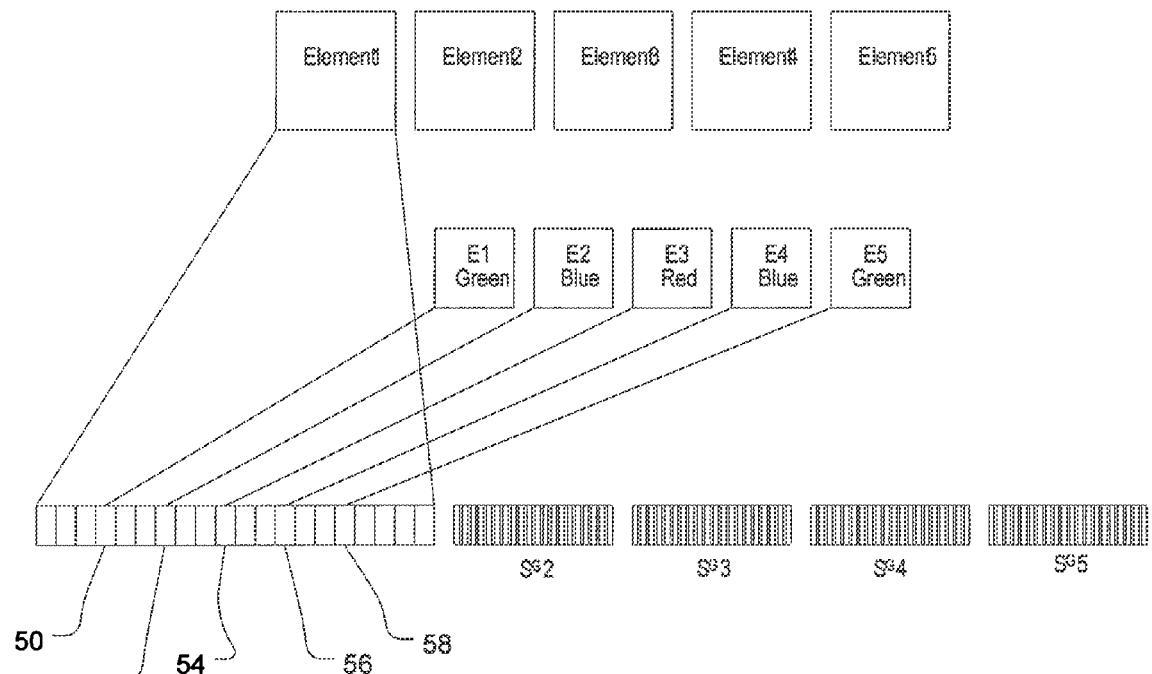
FIG. 4 shows an example of a first order expression of a unique instance pattern.

Within each element of the UIP, is a first order expression of the UIP. This creates a hierarchical watermarking framework. As can be seen in FIG. 4, the UIP in this example may be referred to a green-blue-red-blue-green UIP. This pattern is repeated at the first order segments. The first order segments S1-S20 that make up the element 46 have repeated inside the same pattern at segments 50, 52, 54, 56 and 58.

In the particular example given here, the UIP is Green-Blue-Red-Blue-Green. The pattern then repeats within the green first order expression E1, such that the element 50 is green, element 52 is blue, element 54 is red, element 56 is blue and element 58 is green. This pattern would then repeat in each of the first order expressions.

Figure 5:
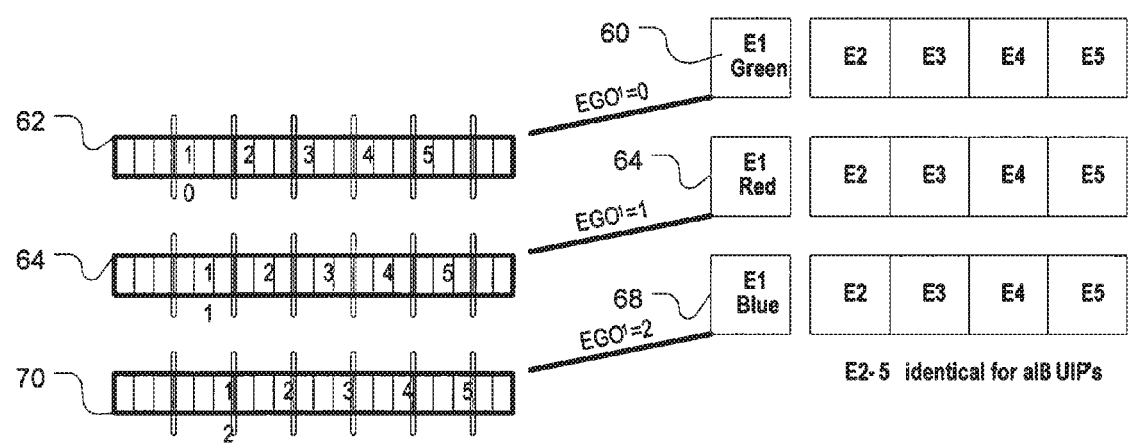
FIG. 5 shows an example of a first order expression for three unique instance patterns having different global watermarks.

FIG. 5 shows first order expressions within the global expression range of the first element 46 for three different UIPs having different global segments for the first element and identical elements for the remaining 4 elements. This highlights the unique elements mappings for each different element within the expression ranges of the first element.

The element 60, when expanded, repeats the green-blue-red-blue-green pattern within its first order segments shown by 62. The element 64, when expanded, repeats the red-blue-red-blue-green UIP shown by 66. Further, the element 68, repeats the blue-blue-red-blue-green pattern shown by 70.

Figure 6:
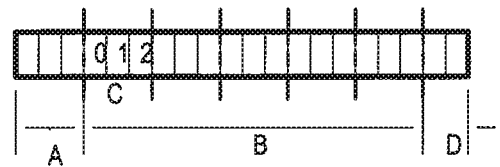
FIG. 6 shows a detailed view of an example of a first order expression.

FIG. 6 shows a more detailed view of the first order expressions. The first part of the expression, A, is a first order offset. The first order offset is the number of first order segments from the start of the global expression data range before the expression groups D at the end of the expression. In this example, the offset is 3.

The part of the expression B is the first order expression groups 1-5. As used here, the term 'expression group' is a set of a number of segments, such as first order segments. In this example, there are three instances, and the UIP contains 5 elements, so there will be 5 expression groups each containing 3 first order segments.

After the first order offset, there is a region C of the expression that comprises the first order expression group offset. SNAP uses a mapping to the global watermarks of the parent UIP element within which the first order expression takes place to determine the first order expression group offset. For example, these offsets may be set by convention in which if the parent element contains the green watermark, the first order expression group offset would be 0. If the parent element contains the red watermark the offset would be one, and if the element contains the blue watermark the offset would be two. This mapping may vary among the five elements, although it may also be the same for all five elements.

The region D of the first order expression is referred to as the first order tail. This tail provides forensic reinforcement of the UIP in the event of splicing attacks. The element of FIG. 6 is a green watermarked element, so the tail D is green. As will be discussed in more detail later, this acts a check on the native watermark of the expression in the case of a splicing attack where different portions of the expression are in the clear and spliced together.

For example, assume that two media instances are sampled and then spliced together at a fine granularity. The first media instance would consist of first order segments 1-20 from a media instance having a green-blue-red-blue-green instance. The second instance would consist of segments 1-20 from a media instance with a UIP of red-green-green-green-blue. When these instances are spliced together, the tail would show both red and green watermarks, indicating that they were spliced and not legitimate expression groups.

This first order level of marking shown in FIG. 6 provides one means of identifying the global patterns of colluding files in the case of interleaving carried out cress an entire global segment. It could potentially be vulnerable to splicing at the first order segment level. SNAP uses a second order expression of the UIP within selected first order segments. That is, when the second order segments are combined together to form the first order segment, second order segments of the other global instances are combined in the pattern of the UIP, at least in part.

For example, using the green-blue-red-blue-green UIP discussed above, the first order segments would be combined into expressions that mimic this UIP. In addition, inside the first order segments, the second order segments would also represent this pattern. In order to mount a collusion attack such as the splicing mentioned above, the pirate would need the ability to identify the granularity of the watermarked patterns. However, SNAP does not rely upon a player's ability to detect or read forensic watermarks, instead using encrypted composite hash tables to identify differently marked data, an attacker's ability to detect and read all marks is highly unlikely.

Figure 7:
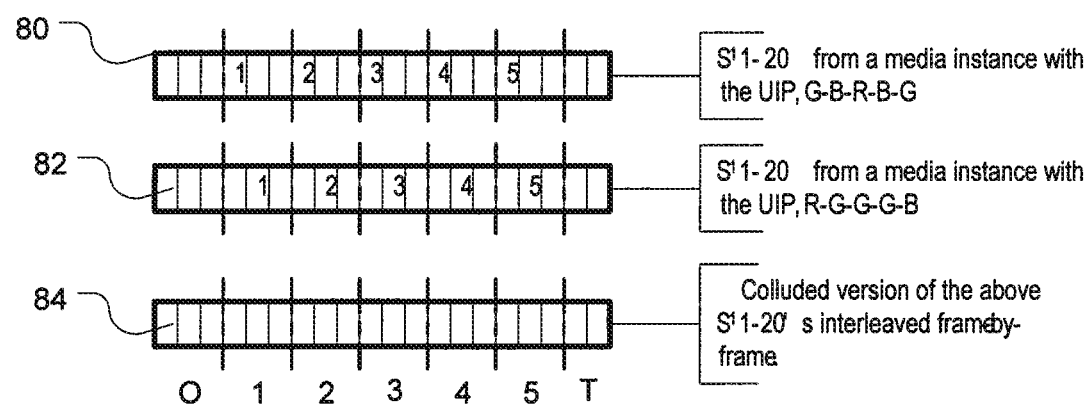
FIG. 7 shows an example result of an interleave attack.

FIG. 7 shows an example of a portion of a media instance where alternating data was sampled from two source files then recombined in an effort to obliterate watermark patterns and gain access to the media instance. The first order segment 80 is the first element consisting of a data range of first order segments 1-20 from a media instance having the UIP green-blue-red-blue-green as discussed above. The first order segment 82 is the first element consisting of a data range of first order segments 1-20 from a media instance having the UIP of red-green-green-green-blue.

The first order segment 84 is a 'colluded' version of the above first orders segments 1-20 interleaved frame by frame in an attempt to obliterate the watermarks. If it were in color it would be of alternating red and green 'stripes' of data. The segments are jumbled and would be unworkable as an actual first element of a UIP. One of the powerful aspects of SNAP, however, is not only its ability to cause such an attack to ultimately fail because the segments will be unusable within the title schema to decrypt the media instance, but also can allow identification of the source of the two spliced files in the event that movie data had been "ripped to the clear".

An analysis of the offset region O of the element 84 shows that the red and green watermarks are present, meaning that the colluding files are 1 element E1 from a red watermarked file and 1 element E1 from a green watermarked file. Further analysis of the offsets will show that there are only two colluding files in this instance, a file with a UIP that begins with red and another that begins with green. Analysis of the portions 2-5 results in identifying the UIP that begins with red to be a UIP of red-green-green-green-blue and the UIP that begins with green is a green-blue-red-blue-green UIP. The tail section T confirms this analysis.

As can be seen from above, the SNAP environment and schema allows not only disabling of the use of the file, but identification of the source of colluded files for forensic tracking of the media instances in the system. This was accomplished using first order expressions of the elements of the UIP. The methodology employed to determine the expressions of second order segments within the first order segments allows for even more granularity.

Figure 8:
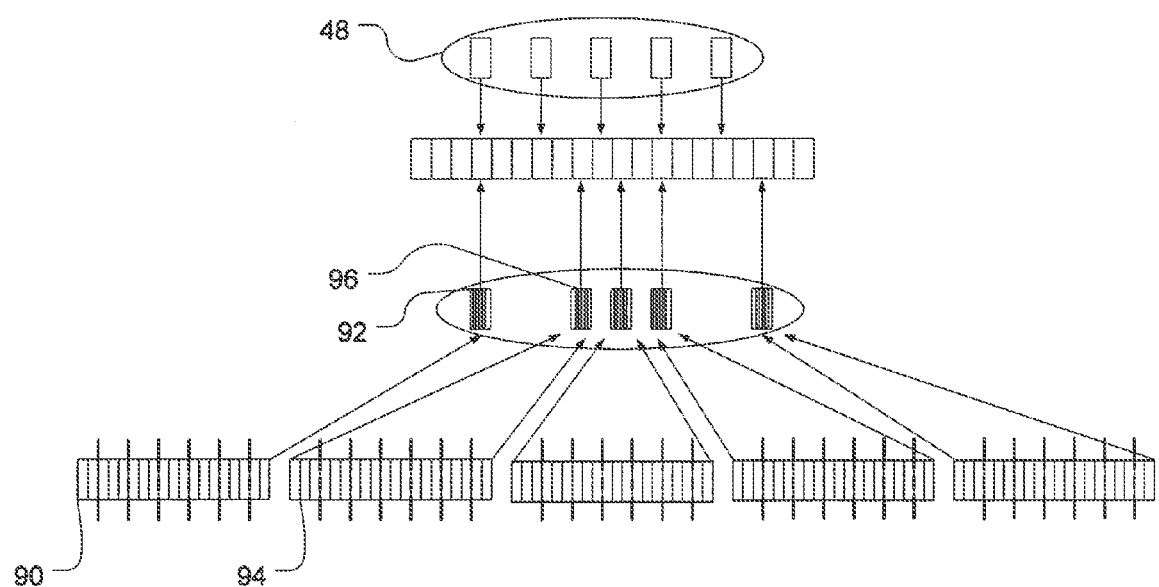
FIG. 8 shows an overview of the second order expressions of a unique instance pattern.

FIG. 8 shows an overview of the second order expressions of the UIP. These offer protection for intermediate granularity attacks where complete first order segments from multiple media instances would be spliced together in an attempt to obliterate a first order watermarking pattern. Second order expressions are normally bounded by individual first order segments to maintain network efficiency for swarming distribution. This is not intended as a limitation, and it is possible for the second order expressions to span first order segment boundaries in the manner of global expressions. Typically, there will be one first order segment containing a second order expression of the UIP within a first order expression group. As mentioned above, it is desirable to randomize the pattern offset from expression group to expression group.

In the example of FIG. 8, first order segments will be selected for the second order expression group using an incrementing form of the expression group offset such that they may occur at multiple offsets throughout the first order expression groups. Internally, the first order expression groups use a second order expression group offset. The second order expression group offset is mapped to the different global watermarks of each element on an element by element basis throughout the UIP.

FIG. 8 shows the first order segments 1-20 from the example file having the global UIP 48 of green-blue-red-blue-green. Each second order segment expression, which is a concatenation of 20 second order segments, mimics the UIP of green-blue-red-blue-green within it in the element values E1-E5, after the initial offset portion and the trailing tail portion. Second order expression group 90 corresponds to the first segment 92 of the first order expression group, and second order expression group 94 corresponds to the ninth segment 96 of the first order expression group. The determination of the first order expression groups consisting of which second order expression groups is driven by the title schema and the offsets that are set by convention.

SNAP Hash Tables

One of the elements that allows the SNAP environment to create and maintain the watermarks is the hash tables. The hash tables are used to manipulate the behavior of swarming applications such that they select appropriate data from peers, driven by the title schema, without the application being able to detect or interpret SNAP's forensic watermarks or the media instance patterns.

In addition, SNAP generally employs CMAC (cipher-based message authentication code) tags. These tags, when received, are compared to a generated tag from the message using a key that is cryptographically bound to the physical attributes of the storage media it is delivered to in order to ensure they match. These tags are renewable. When the watermarked and encrypted data is hashed with a new CMAC key a complete renewal of descriptor metadata occurs. This does not invalidate movies previously delivered, but disallows the exchange of keys and/or descriptor metadata among users as in the case of a key sharing attack. CMAC tags also provide authentication of the data and error correction.

The CMAC tags of every segment within a unique media instance are contained in the composite hash table for the media instance. It is referred to as a composite hash table because, like the watermarking, the hash table generation employs a bottoms up methodology as shown in FIG. 9.

Figure 9:
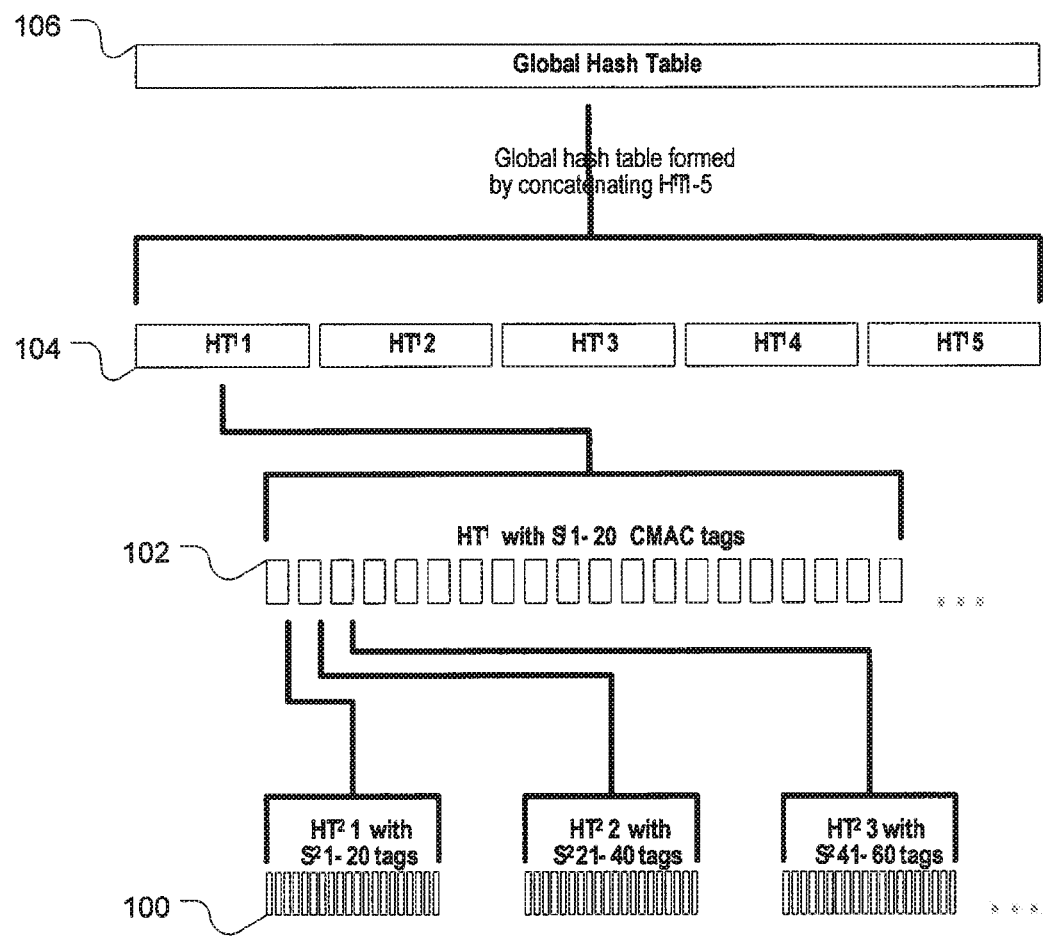
FIG. 9 shows an example of a hash table hierarchy.

FIG. 9 shows an overview of a hash table hierarchy for one media instance corresponding to one watermarking method. In this example, the media instance is the blue watermarked instance. The process begins with the second order segments. The second order keys are batch calculated by first hashing plaintext second order segments using the renewable title crypto CMAC keys. Each segment's CMAC tag is then combined with an analogous tag from a master key second order hash table ($HT^2$) such as 100 using a non-reversible combine function. Master key second order hash tables are analogous to first order key has tables in structure, but populated with unique random values. One set of master key second order hash tables may be used for all media instances.

As mentioned above, one advantage of using CMAC rather than the more common SHA-1 or MD5 plain hashing is that CMAC allows SNAP to quickly renew a title's keyset by changing the title crypto CMAC key and repeating the key generation process. The process may even occur after a title has been released into the network without requiring re-mastering.

The CMAC tags for each group of second order segments that comprise a first order segment are written into a first order key hash table such as 102. Each CMAC tag is then combined with its corresponding random hash analog from the first order segment master key has table such that the resultant value may be used as a unique segment key. SNAP then encrypts each second order segment to its corresponding key.

It is desirable that all hashes and random values are verified as unique after each state of pre-processing to ensure that no data exhibiting a hash collision is published. A hash collision occurs when two different segments have matching hashes. If this occurs, one of the instances must have it data modified in a non-user perceptible manner such that it returns a unique hash. This ensures that the tags can serve as unique identifiers for the segments they describe and to protect against attackers being able to use hashing collisions to reverse engineer hashing algorithm behavior and subsequently discover encryption key generation methods.

As an added protection, the first order key hash tables such as 102 are cross mapped. Cross mapping involves using a CMAC tag for an analogous second order segment from another watermarked media instance to generate the second order segment. For example, a key for a blue second order segment would be generated using the hash of the analogous red second order segment. Red second order segment keys would be generated with hashes of the green second order segments, and green second order segments would derive their keys from the blue second order segments. In this manner, keys are derived in a manner using information that any individual media player will not possess.

After encryption of the second order segments, they are concatenated together to create first order segments. The resulting first order segments are hashed using the same CMAC used to write the second order hash tables. The CMAC tags are then written to the first order hash tables. The second order hash tables previously created may be nested under their respective first order segments CMAC tag in the first order hash table ($HT^1$) 104.

The first order hash tables such as 104 are then combined to create the blue global hash table 106. The blue global hash table then contains all of the necessary information to describe any blue first and second order segments in order to reconstitute a media instance using blue watermarked segments. When used in conjunction with the red and green global hash tables, a media instance using multiple global watermarks may be decrypted.

Figure 10:
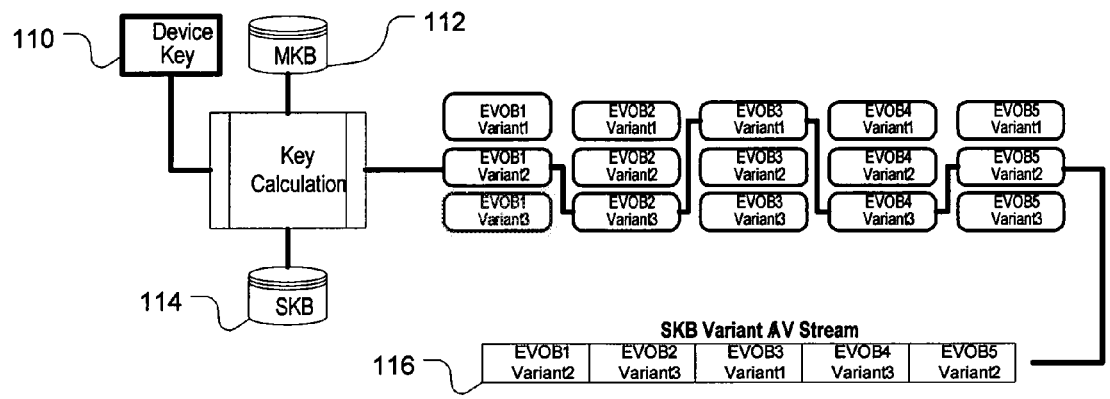
FIGS. 10 and 11 show a comparison of simple non-autonomous peering pattern expressions and decryption path-based forensic identification methods.
Figure 11:
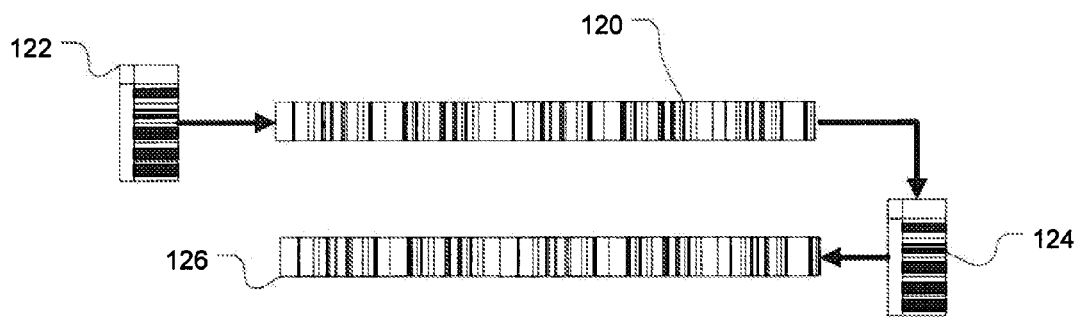

FIGS. 10 and 11 show a comparison of SNAP's pattern expressions and decryption path and patterns generated by a sequence key based (SKB) system. FIG. 10 shows a forensic pattern based upon the SKB system. Using a device key at a device such as a media player 110, a media key bundle 112 and the sequence key bundle 114, the variants of enhanced video objects (EVOBs) are placed into a patterned resulting audio video stream 116.

While the resultant complexity would appear on its face to protect the media instance, far more critical is the pattern leakage. EVOBs are discrete files that directly represent the boundaries of the forensic watermarking pattern. This provides hackers with pattern information that could allow them to spoof the forensic patterns. This in turn comprises the ability to forensically detect the decryption player.

In contrast, the media instance 120 shown in FIG. 11 is represented only in part by the encrypted composite hash table 122. The actual resulting media stream 126 is a result of further encryption at two further levels as discussed in detail above, requiring the unique encrypted composite key bundle 124. In this manner, the multi-level watermarking and use of the UIP throughout the levels of the media instance, as well as the hash table generation and compositing, the SNAP environment provides a secure authentication environment for media instances that are not only have higher levels of hacker protection, but also have forensic capabilities to detect decrypting players.

One aspect of the SNAP environment that has been mentioned above is the separation of the decryption and the keys from any particular media player. In a typical secure environment, the requesting player receives the key and/or hash tables that then allow the player to decrypt the desired media stream. In the SNAP environment, the decryption capability is player independent and thereby makes it both more robust and more resistant to having keys reside at any particular device.

However as mentioned previously, when content is stored on physical media it is important to bind the content and keys to the media such that it cannot be transferred without authorization. Both the SNAP encrypted unique media instances and the separate keys need to be cryptographically bound to the media to prevent unauthorized transfer from one NAND flash device to another NAND flash device. This is discussed in more detail below in the SNAP Secure Host Environment.

SNAP Secure Host Environment

The SNAP secure host environment has a SNAP Renewable Logic, code that resides in a secure processor on the player host or in the NAND flash card controller or in both. The SNAP Renewable Logic contains data and templates for generating specific cryptographic data. A SNAP Renewable Logic is an intermediary that provides a known cryptographic environment for communication and cryptographic calculations between its host application and SNAP enabled NAND Flash devices.

SNAP Renewable Logic transforms cryptographic data differently for each NAND flash device. The inputs to the SNAP Renewable Logic include: 1) device bad blocks, chip ids, SNAP chain logs, SNAP segment chains and 2) a SNAP renewal string. The outputs of the SNAP Renewable Logic are a SNAP HAK (hardware authentication key), which is used to authenticate and cryptographically protect the SNAP HAN (hardware authentication number). The SNAP Renewable Logic performs differently on each NAND flash device because the input variables listed in 1) above vary from NAND flash device to NAND flash device.

This provides a greater level of complexity for an attacker because it is unlikely that any two NAND flash devices use the same authentication and cryptography in an identical manner. The SNAP renewal string changes the logic, both the algorithm and the variables used in SNAP processing. This SNAP renewal string can be updated on a periodic basis to enable a Studio to change the manner in which unique media instances and the respective keys are cryptographically bound to the defects of a NAND flash device.

Authenticating Non-Volatile Storage Media

In one embodiment, the trust transaction may be performed using the random nature of bad blocks on the non-volatile storage media. Generally, manufacturers of flash and other storage media use a method of bad block identification that allows the device to identify bad blocks of physical memory following manufacture. By doing so, the manufacturer can still sell the device and it will operate as intended, as the bad blocks are marked and identified for any processing device that accesses the remaining 'good' blocks of memory.

During post manufacture testing, each block of physical memory undergoes multiple 'program,' 'read' and 'erase' operations. When any or all of the pages that make up a memory block fails, the entire block is marked bad by writing a specific value (e.g. 'ooh') in pages of the bad block, as well as within the Spare Area related to the block. These bad blocks detected at manufacture are differentiated from the bad blocks detected during subsequent consumer operation of the device. Bad blocks identified during consumer operation are identified by writing a different value (e.g. 'Foh') in the pages and spare area of the block.

Since the pattern of bad blocks identified at the time of manufacturing is random, this information provides a unique value usable to provide a unique authentication and cryptography mechanism. The pattern of bad blocks may be combined with the unique media ID of the device to create a unique authentication value. It may also be possible to identify a specific page which has failed within a block of memory, the value of which may also be usable to enhance the robustness of this authentication. This would allow for a unique authentication value at manufacture, but some sort of infrastructure may be helpful to ensure that this unique value is monitored and tracked to prevent it from being forged or otherwise copied.

Figure 12:
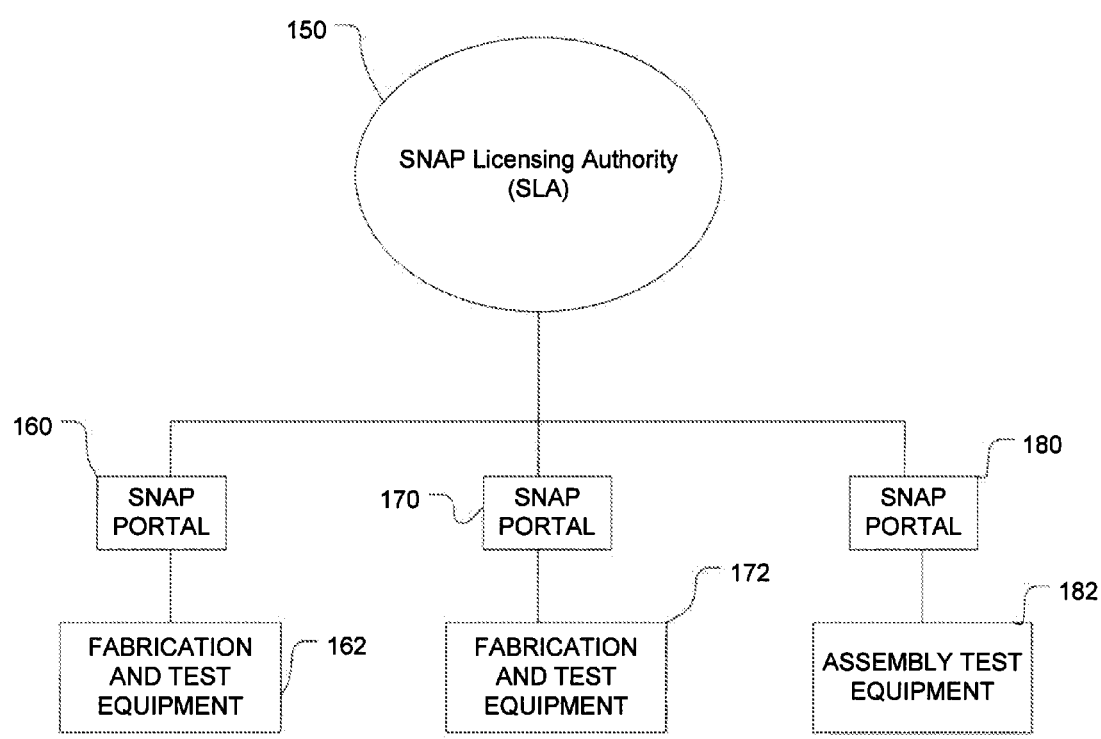
FIG. 12 shows an overview of a licensing and authentication system for manufacture and assembly of components of a simple non-autonomous peering compliance process.

The manufacture of these devices may be performed under a central licensing authority, where the licensing authority ensures that devices are 'SNAP compliant.' An overview of such a system is shown in FIG. 12. In FIG. 12, the SNAP Licensing Authority, or SLA, 150 has secure connections through portals available at the various points in the manufacturing chain. These portals such as 160, 170 and 180, provide a secure and authenticated link to the SLA. This increases the difficulty that a rogue fabricator/pirate would have in trying to hack or otherwise subvert the information exchanged between these two entities.

Typically, the manufacturing chain would have at least three portions. The SNAP portal 160 resides at a chip manufacturer that produces NAND Flash memory chips. The use of the term chip with respect to NAND Flash memory shall be considered to broadly cover any NAND Flash memory array (die) whether it is in the form of a discreet IC packaged commodity memory chip, or integrated into another device, as in the case of a Multi Chip Package (MCP), or Solution on a Chip (SoC). Multi-planar devices containing multiple planes of either SLC or MLC NAND Flash shall have their planes treated in a manner that is consistent with their memory addressing behavior (single or multi-device addressing).

The SNAP portal 170 resides at a memory controller manufacturing facility. Most non-volatile memory products have an on-board controller to manage the movement of data into and out of the various memory structures on the product. In the discussion here, this controller will be manufactured according to the SNAP protocols and may be referred to as the SNAP compliant The SNAP portal 180 resides at an assembler that combines a controller with a set of memory devices into a consumer product, such as a memory product (SD card, Flash thumb drive, etc., a digital media content player, such as a MP3 player, a video game player with movie or music capabilities, or any other product that uses non-volatile memory to store digital content. For purposes of this discussion, each entity will be discussed as though they were separate entities, with the understanding that they may occur in any combination of entities or all at one place. Compartmentalization may be preferable, as it adds an additional layer of security. Each entity requires a license. Memory fabricators will have a chip binding license, controller fabricators will have a controller binding license and assemblers will have a chipset binding license. If one entity were performing all three functions, that entity would have all three licenses, increasing the risk of breach.

Figure 13:
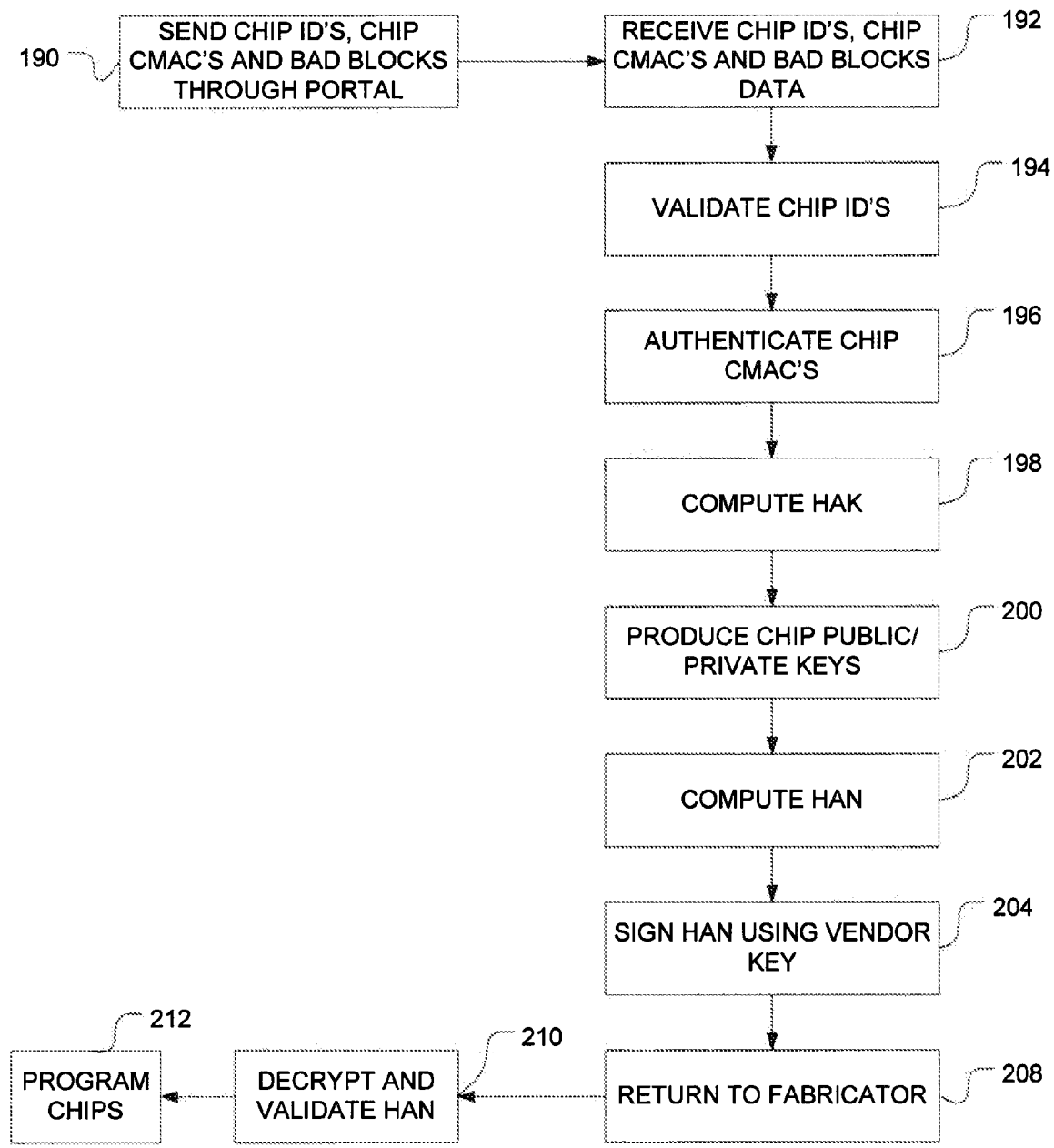
FIG. 13 shows an example of a method of binding a unique chip identifier to the physical defects of that chip.

FIG. 13 shows an example of a method to generate and imprint a unique chip identifier (ID) onto the memory chips. The term 'chip' as used here an in the claims refers to any individualized portion of memory.

In the diagram, the blocks to the left side of the figure are performed at the fabricator and the blocks to the right side are performed at the SLA. The process begins at 190 when the fabricator tests a completed memory chip and determines its bad blocks, as discussed above. The bad block data is received at 192 at the SLA. The SLA then assigns a unique chip ID to the chip at 194 and decrypts the bad block data at 196. If the memory is being programmed one chip at a time, the Fabricator may be a memory manufacturer. Alternatively, when memory chips are being grouped together, the Fabricator may be an assembler as well, as is discussed in more detail below with regard to the controller and chip set programming.

The SLA then performs at least one operation on the bad block data, either alone or in combination with the chip ID, to produce a unique identifier for the chip. The chip ID is then signed by the SLA using a vendor-specific CMAC key for that fabricator at 200. The signing process may employ a public key such that it may be authenticated by devices other than the SLA, or it may employ a secret key only such that only the SLA may authenticate it. The resulting CMAC digest is referred to herein as a Chip CMAC.

Using the chip's private key, the SLA then encrypts the chip ID and is signature tag to create a Hardware Authentication Number (HAN) at 204. The SLA then signs the chip ID and HAN at 206 and encrypts them. The encrypted HAN and ID are then sent to the SNAP portal at the fabricator at 208.

Back at the fabricator, the SNAP portal decrypts and validates the HAN at 210. Either under control of the SNAP portal, or possibly within the SNAP portal itself, the chip is them programmed with the HAN and chip ID. The programming may involve a 'write once' strategy, in which a set of gates within the memory (such as NAND gates in a NAND flash memory) are physically damages so as to be read-only. This adds another layer of security, as it prevents changing of the chip ID or HAN.

Figure 14:
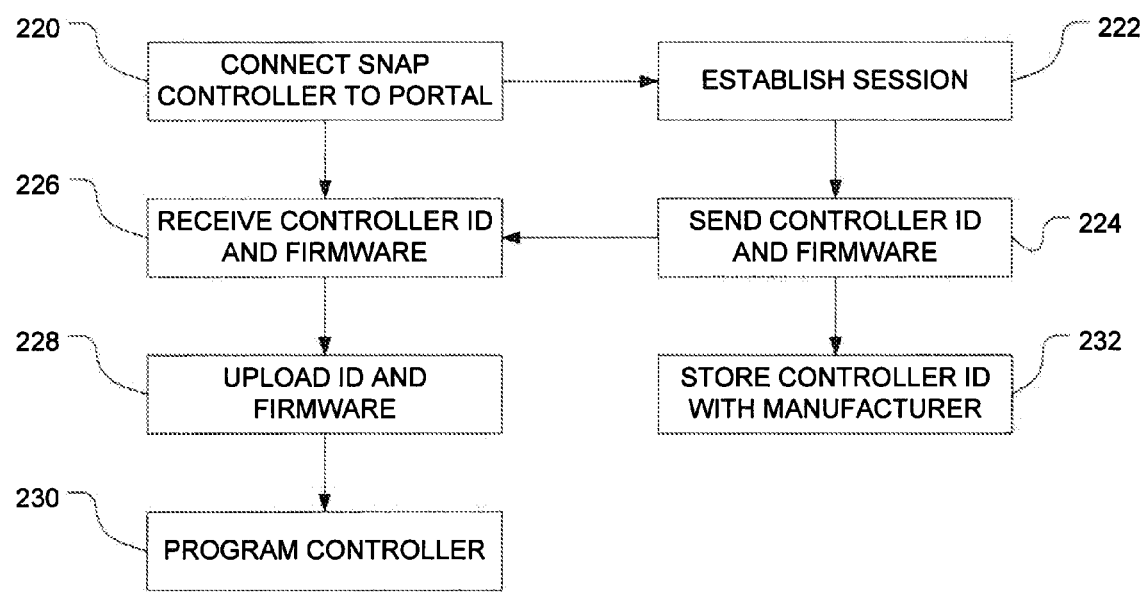
FIG. 14 shows an example of a method of creating a unique controller identifier for memory controllers.

Unlike the SLA-centric chip identifying process, the process for controllers is somewhat more involved for the fabricator. An example of this process is shown in FIG. 14. At 220, a SNAP controller is connected to the SNAP portal at the controller fabricator. The SLA or the SNAP portal, or both, establish as session as 222. The SLA then sends the controller ID and the firmware to the fabricator at 224. The SLA may record the controller ID into a database or other type of storage, associated with the fabricator, for later monitoring and tracking, at 232.

Meanwhile, the fabricator has received the controller ID and the firmware through the SNAP portal at 226. The SNAP portal, either by itself, or by controlling the fabricator's machinery uploads the firmware into the controller, making the controller a SNAP controller, at 228. The SNAP controller is then programmed with the controller ID at 230.

Figure 15:
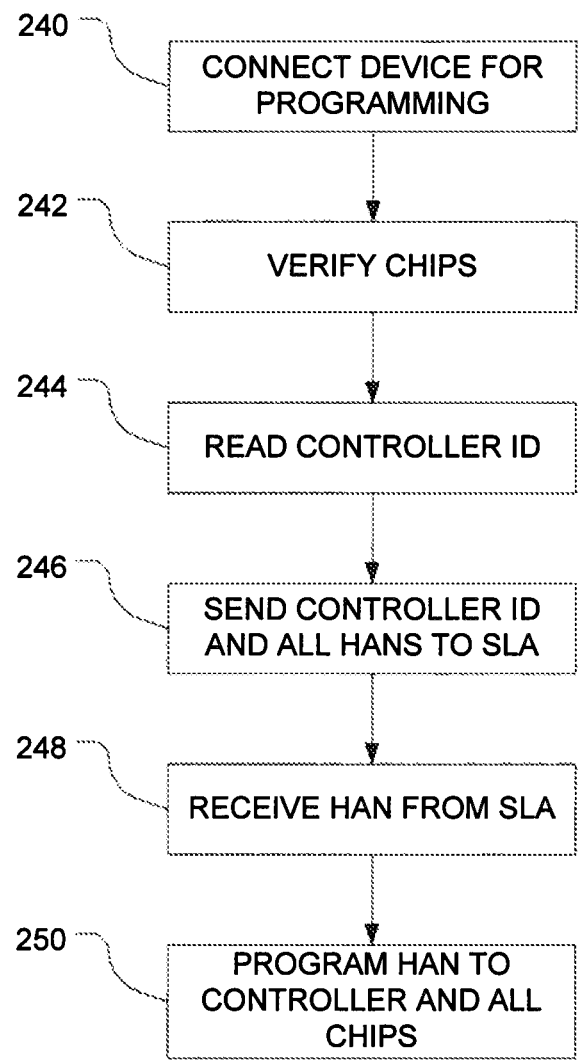
FIG. 15 shows an example of a method to bind a unique controller with a unique set of memory chips.

Having seen how one could assign unique IDs to the memory chips and the memory controllers, the discussion now turns to binding a unique controller with a set of memory chips, referred to as chipset binding. An example of this process is shown in FIG. 15.

At 240 the device that contains both memory chips and a controller is connected to the SNAP portal for programming. The chips are verified, typically by performing program/verify and erase/verify testing on each chip to detect counterfeit SNAP compliant chips. This may be accomplished by having the bad blocks tags erased. If this is detected, the device is rejected as counterfeit. Further testing may include parsing a chip's spare area to detect the presence of any runtime bad blocks. The SNAP portal may also authenticate the chip's HAN according to a field parsing of the HAN.

Upon verification of the chips, the SNAP portal reads the controller ID at 244 and sends the controller ID and all HANs to the SLA at 246. The SLA then computes a different Hardware Authentication Code (HAN) and returns it to the SNAP portal at 248. The portal then programs the HAN to the SNAP controller and each chip using, for example, the write once strategy discussed above. As an added measure of security, the SNAP controller and the SNAP portal jointly compute an encrypted block failure log that contains all bad block addresses for all chips in the chipset, and may write those to each constituent chip's system area for future reference. Any use of the device containing this controller and chips in compliance with SNAP will ensure that the chips and the controller all have matching HANs to ensure that the device is valid.

Figure 16:
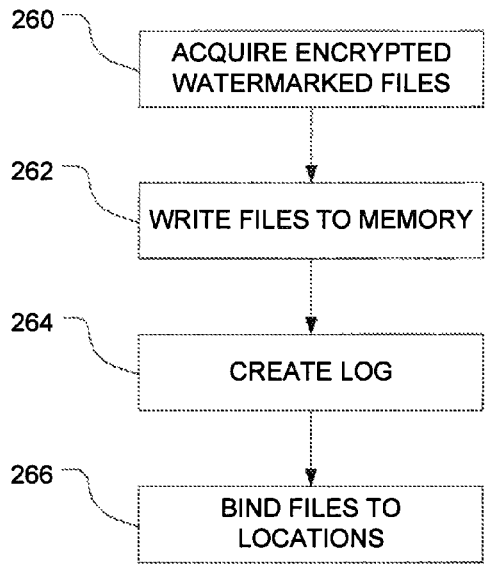
FIG. 16 shows an example of a method of writing a media file to a memory device that complies with simple non-autonomous peering.

Once the SNAP compliant devices manufactured from the above processes become available, they can be used to provide media content to users. An example of this process is shown in FIG. 16. In FIG. 16, the media files are acquired. The media files may desirably be those using the watermarking hierarchy discussed above with regard to FIGS. 1-11. The watermarked instance or instances are then written into the memory at 262.

The manufacture of the finished products that include the media files may be recorded in a database. The database will allow tracking of copies of the content and provide the basis for the content providers to receive license royalties.

Once the files are written to memory, a log may be created, binding the logical and physical locations of the files in the memory at 266. This log can then be used to verify and confirm the authenticity of the memory content upon access. An example of this process is shown in FIG. 17.

Figure 17:
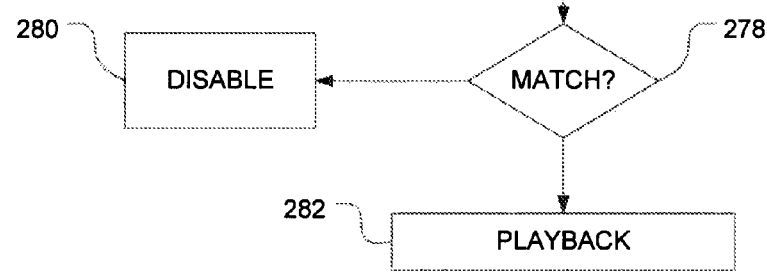
FIG. 17 shows an example of a method to validate a media file in a memory device.

In FIG. 17, a SNAP compliant device, having watermarked content in memory chips under the control of a SNAP controller is connected to a host device. This may be a computer, a set-top box, kiosk, television, media player, portable device, etc. This process may involve an update of either the device or the host device, depending upon the dates of the update files on either device.

Upon manufacture, the host devices is provided with the most up to date information on watermarking algorithms, as discussed above, as well as the media key bundles, revocations of licenses, either for users, media or devices, etc. Similarly, upon receiving a media instance, a device receives the most up to date information at that time. When the device and the host device connect, a determination is made as to which has the most up to date information and whichever one does, it provides that information to the other device. In this manner, the most up to date information with regard to licenses, revocations and algorithms propagates throughout SNAP compliant devices. Host devices may be updated every time they connect with a new piece of media, either by external connection to a device or when a media instance is downloaded through a network.

Once the update has completed at 270, the host device acquires the log file of the files and locations generated upon writing of the media instance into the memory at 272. This log file is then decrypted/decoded to authenticate the media file based upon its locations in the memory at 274.

Meanwhile the memory controller will perform the same operations on the log file and the two results are compared at 276. If the two results match at 278, the playback of the media instance is allowed at 282. If the two results do not match, the device is disabled, or the media instance is disabled at 280.

Having established the various components and methods of the SNAP infrastructure, it is useful to discuss the events occurring as a host device requests and then plays some piece of content, such as a movie, an audio file, etc. These will be discussed in terms of a movie in FIGS. 18-21, with the understanding that the content is any type of protected content that is in downloadable form.

Figure 18:
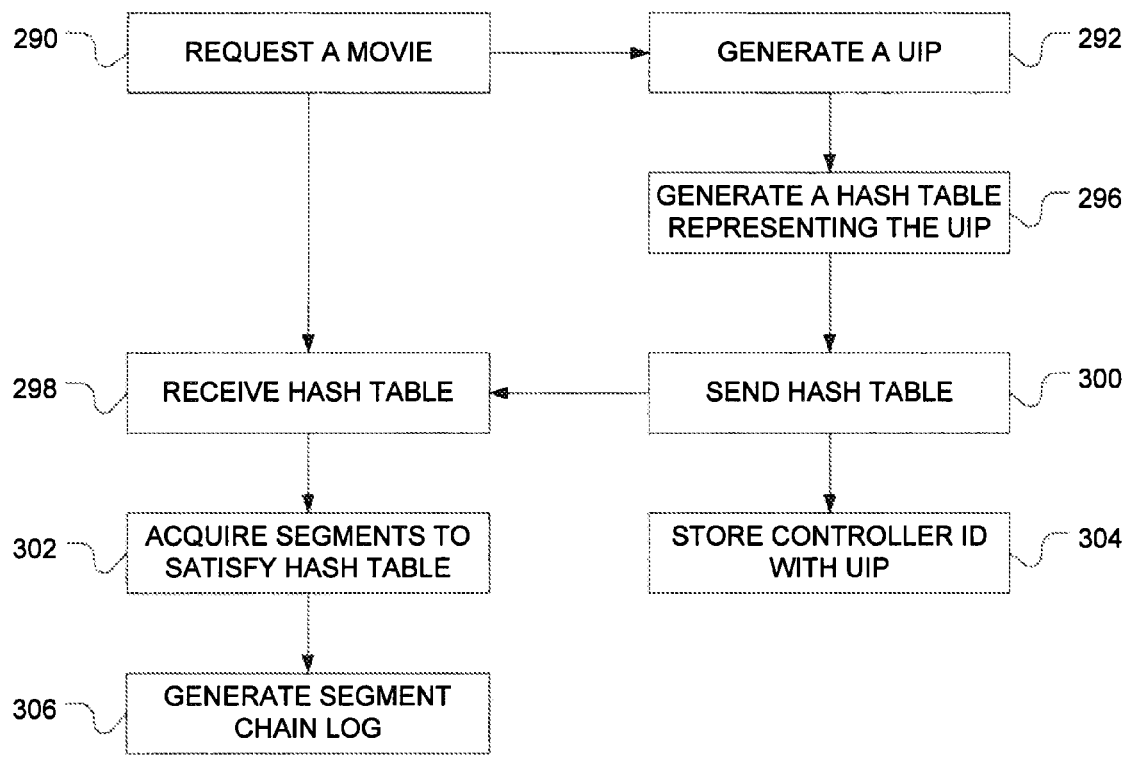
FIG. 18 shows an example of a transaction between a host device requesting download of content under control of the SNAP licensing authority.

In FIG. 18, a host controller requests to download content from the SNAP licensing authority (SLA) server. This download, as discussed in much detail previously, may actually be from peer devices, but under control of the SLA server. At 290, the controller in the playback device contacts the SLA server and requests the content, in this example, a movie.

The server generates a unique instance pattern (UIP) such as those discussed in detail above, at 292, and generates the hash table associated with the UIP at 296. At 300, the server sends the hash table to the host controller, and then stores the controller ID of the host controller with the UIP at the server side. This allows for identification of any instances of the UIP that appear, such as in the colluded attacks discussed above, and allows tracking of the source of the segments being pirated.

At 298, the host controller receives the hash table. At 302, the host controller locates the various segments of the movie, wherever located, to fulfill the requirements of the hash table. Some segments may be obtained from peers, others may be obtained from a content provider, etc. At 306, the host controller generates a segment chain log. A segment chain log is a log of the locations of all segments of a movie instance. The segment chain log may be generated by the host controller upon storage of the movie into an attached flash device, or even in its own non-volatile memory. A chain log is a sequential log of the physical (chip/block/page) addresses where a specific segment of a movie instance is stored in a NAND flash chip. Chain log may be associated with a device, a segment or a complete piece of content, such as a movie.

Figure 19:
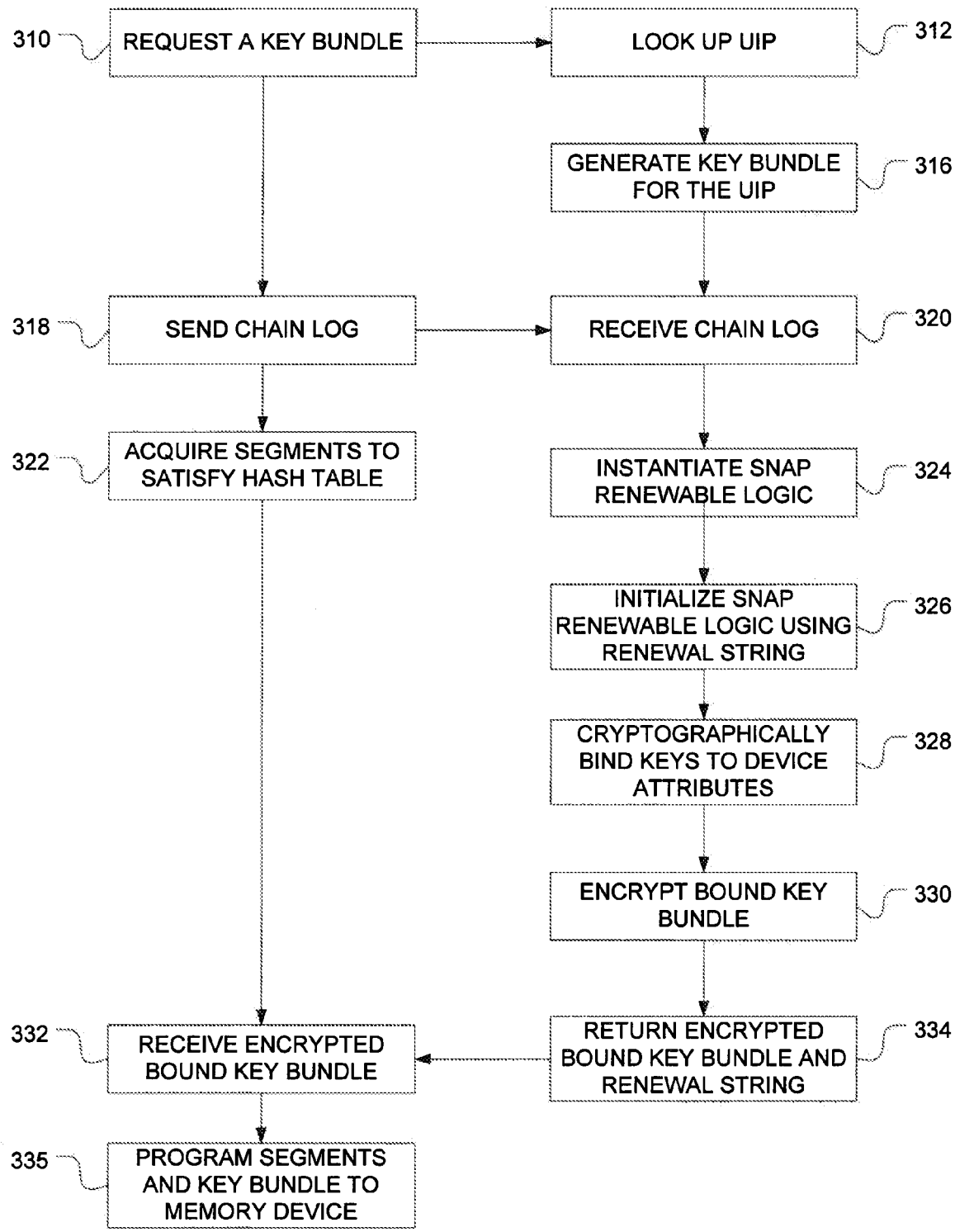
FIG. 19 shows an example of a host device requesting to decrypt downloaded content.

Having fulfilled the hash table and acquired all the necessary segments, the host controller now will acquire all of the necessary keys to allow access to the encrypted segments. This is shown in FIG. 19.

At 310, the host controller contacts the SLA server and requests a key bundle for the UIP that it downloaded. The server looks up the UIP at 312 and generates its key bundle at 316. Meanwhile, the host controller sends the chain log generated upon reception of all of the segments at 318. The SLA server receives the chain log at 320.

The SLA server instantiates the SNAP Renewable Logic, discussed above, at 324, and initializes it using a renewal string at 326. This ensures that the SNAL Renewable Logic 'refreshes' the processes used to generate keys, making them harder to break. At 328, the SLA server uses the chain log that identifies the locations in the device where the segments are stored to bind the keys to these device attributes. This entire bundle is then encrypted at 330 and returned with the renewal string to the host device at 334.

The host controller receives the bound key bundle and renewal string at 332. As mentioned with regard to FIG. 16, the renewal string may be passed from one device to another upon connection as part of the most updated information with regard to renewals and revocations. At 335, the host device programs the key bundle, the renewal string and the program segments to the flash device.

Figure 20:
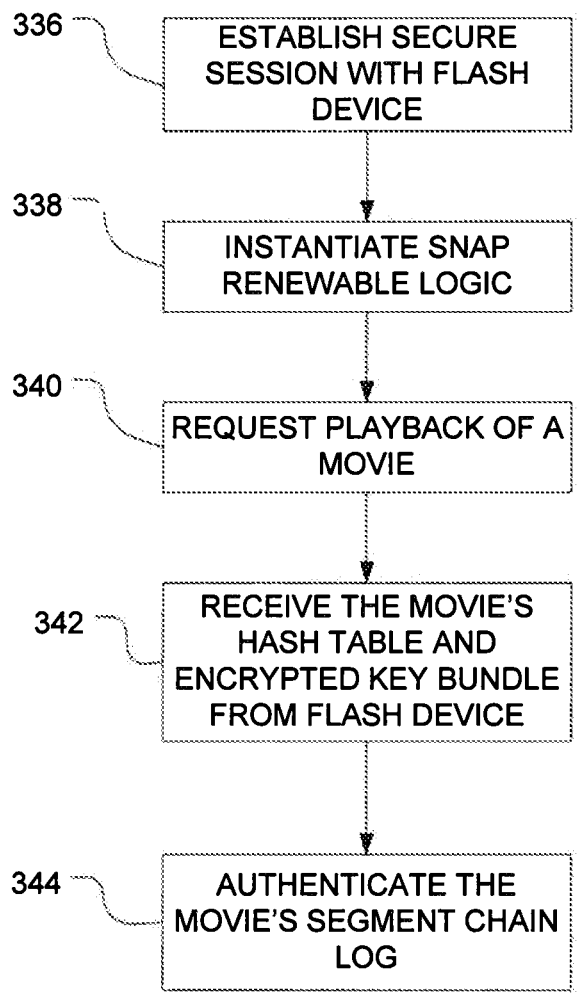
FIG. 20 shows an example of a host device authenticating content on memory device.

The content now resides on the flash device, ready for access by an appropriate host device. An example of this process is shown in FIG. 20. At 336, the host device establishes a secure session with the flash device. The host device instantiates the SNAP Renewable Logic at 338, and requests playback of the movie stored on the flash drive at 340. The flash device provides the movie's hash table and encrypted key bundle to the host device at 344. The host controller authenticates the movie's segment chain log at 346 to ensure that the copy of the content is valid. Upon authentication, the host can play the movie.

Figure 21:
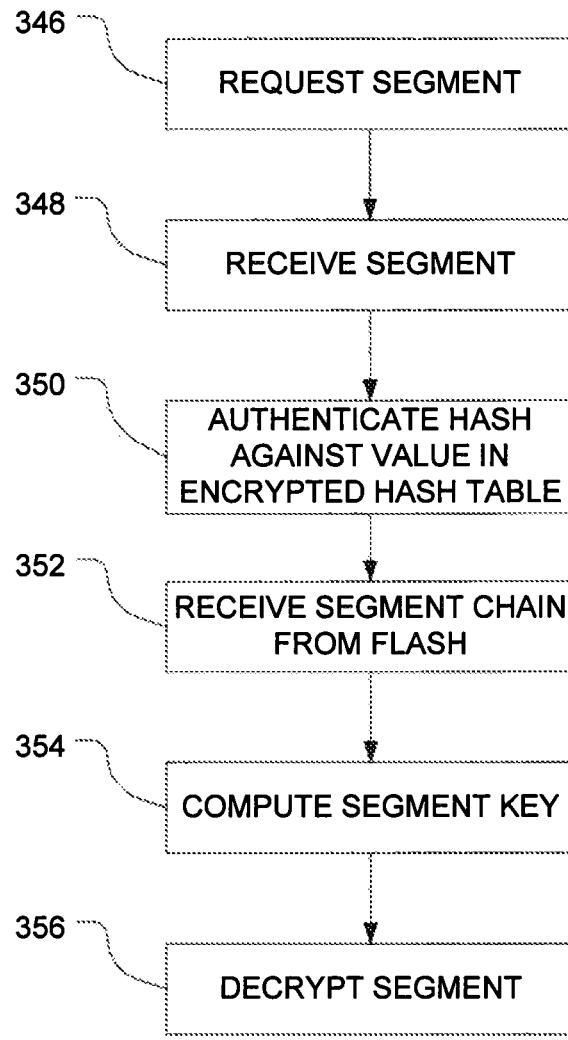
FIG. 21 shows an example of a host device playing content from a memory device.

Playing the movie or other content launches a final process in the authentication and security structure. An example of this is shown in FIG. 21. The host controller plays the movie by requesting the movie segments previously downloaded into the flash device at 346. The segments are received at 348. These segments may be second order segments as discussed in detail above with regard to watermarking.

The hash of the segment is authenticated against the previously provided value in the encrypted hash table at 350. The chain log for that segment is provided at 352 from the flash device, which the controller uses to compute the key for that segment at 354. Once the key is computer, the host controller can decrypt the segment at 356 and being rendering the content to a user.

In this manner, multiple levels of security, from the watermarking of the content to the generation of a unique identifier for the memory chips, the controller and the chipset upon which the content will be stored, protect the content providers from pirating of their content. The transactions discussed here, from the watermarking and loading of media files to the manufacture and binding of product components to the media files are tracked and recorded, allowing distribution of content while ensuring both protection of rights and the revenues that flow from those rights.

Thus, although there has been described to this point a particular embodiment for a method and apparatus for a SNAP environment, watermarking of digital data at multiple levels, and authentication of carrying devices, it is not intended that such specific references be considered as limitations upon the scope of this invention except in-so-far as set forth in the following claims.

What is claimed is:

1. A method of providing a unique media content instance, comprising:
    generating a first version of media content and a second version of the media content, wherein the first version of the media content is different than the second version of the media content;
    segmenting the first version of the media content into a plurality of first media content version segments;
    segmenting the second version of the media content into a plurality of second media content version segments; and
    defining the unique media program content instance from the first media content version segments and the second media program content version segments according to a pattern defined by a title schema uniquely associated with the unique media content instance, the defining comprising:
        combining the first media program content version segments and the second media content version segments according to the pattern to define first order media program content segments;
        combining the first order media content segments according to the pattern to define the unique media program content instance;
    wherein the first media content version segments and the second media content version segments correspond to a similar data range and the title schema determines which segments are selected from which version of the media content to define the unique media program content instance.

2. The method of claim 1, wherein the first version of the media content and the second version of the media content are watermarked according to different watermark data.

3. The method of claim 1, wherein the first version of the media content and the second version of the media content are watermarked according to a different watermark technique.

4. The method of claim 1, wherein combining the first order media content segments according to the pattern to define the unique media content instance comprises:
    combining the first order media content segments at least in part according to the pattern to define global media content segments; and
    combining the global media content segments at least in part according to the pattern to define the unique media content instance.

5. The method of claim 4, wherein:
    the first media content version segments and the second media content version segments are concatenated to define the first order media content segments; and
    the global media content segments are concatenated to define the unique media content instance.

6. The method of claim 5, wherein the title schema defines an offset of a first of the first order media content segments within each of the global media content segments and the pattern of the concatenated first order media content segments that define the global media content segments.

7. The method of claim 1, wherein the first media content version segments and the second media content version segments correspond to the same data range.

8. An apparatus for providing a unique media program content instance, comprising:
    a memory, storing a plurality of instructions;
    a processor, coupled to the memory and configured to execute the instructions to: generate a first version of a media content and a second version of the media content, wherein the first version of the media program content is watermarked differently than the second version of the media-content;
    segment the first version of the media content into a plurality of first media content version segments;
    segment the second version of the media program content into a plurality of second media content version segments; and
    define the unique media program content instance from the first media content version segments and the second media program content version segments according to a pattern defined by a title schema uniquely associated with the unique media content instance, the defining comprising:
    combining the first media program content version segments and the second media content version segments according to the pattern to define first order media program content segments; and
    combining the first order media content segments according to the pattern to define the unique media program content instance;
    wherein the first media content version segments and the second media content version segments correspond to a similar data range and the title schema determines which segments are selected from which version of the media content to define the unique media program content instance.

9. The apparatus of claim 8, wherein the first version of the media content and the second version of the media content are watermarked according to different watermark data.

10. The apparatus of claim 8, wherein the first version of the media content and the second version of the media content are watermarked according to a different watermark technique.

11. The apparatus of claim 8, wherein the instructions for combining the first order media content segments according to the pattern to define the unique media content instance comprise instructions for:
    combining the first order media content segments at least in part according to the pattern to form global media content segments; and
    combining the global media content segments at least in part according to the pattern to form the unique media content instance.

12. The apparatus of claim 11, wherein:
    the first media content version segments and the second media content version segments are concatenated to define the first order media content segments; and
    the global media content segments are concatenated to define the unique media content instance.

13. The apparatus of claim 11, wherein the title schema defines an offset of a first of the first order media content segments within each of the global media content segments and the pattern of the concatenated first order media content segments that define the global media content segments.

14. The apparatus of claim 8, wherein the first media content version segments and the second media content version segments correspond to the same data range.

15. A non-transitory, tangible computer-readable storage medium storing a unique media content instance, the unique media content instance comprising:

a plurality of first media content version segments, the plurality of first media content version segments comprising segments of a first version of the media program content; and a plurality of second media program content version segments, the plurality of second media content version segments comprising segments of a second version of the media content; and wherein:

the first and second media content version segments correspond to a similar data range and the unique media content instance comprises a unique combination of the first media program content version segments and the second media content version segments defined according to a pattern defined by a title schema uniquely associated with the unique media content instance, the unique combination representing a watermark interpretable by a processor for identifying the unique media content instance;

wherein the unique combination of the first media content version segments and the second media content version segments comprises a plurality of first order media content segments, combined according to the pattern, each first order media content segment comprising an associated at least some of the plurality of first media program content version segments and an associated at least some of the plurality of second media content version segments combined according to the pattern; and the title schema determines which segments are selected from which version of the media content to define the unique media content instance.

16. The storage medium of claim 15, wherein the first version of the media content and the second version of the media content are watermarked according to different watermark data.

17. The storage medium of claim 15, wherein the first version of the media content and the second version of the media content are watermarked according to a different watermark technique.

18. The storage medium of claim 15, wherein:
the unique media content instance comprises a plurality of global media content segments, each global media content media content segment comprising an associated at least some of the plurality of first order media content segments, combined according to the pattern.

19. The storage medium of claim 18, wherein:
the first media content version segments and the second media content version segments are concatenated to define the first order media content segments; and
the global media content segments are concatenated to define the unique media content instance.

20. The storage medium of claim 18, wherein the title schema defines an offset of a first of the first order media content segments within each of the global media content segments and the pattern of the concatenated first order media content segments that define the global media content segments.

21. The storage medium of claim 20, wherein:
the first media content version segments and the second media content version segments are second order media content segments;
the title schema defines the combination of second order media content segments and first order media content segments for all instances of the media content.

22. The storage medium of claim 15, wherein the first and second media content version segments correspond to the same data range.

* * * * *